H. N. LEASK.
MEANS FOR CHARGING REFUSE DESTRUCTORS.
APPLICATION FILED OCT. 30, 1908.
974,680.
Patented Nov. 1, 1910.
7 SHEETS—SHEET 1.
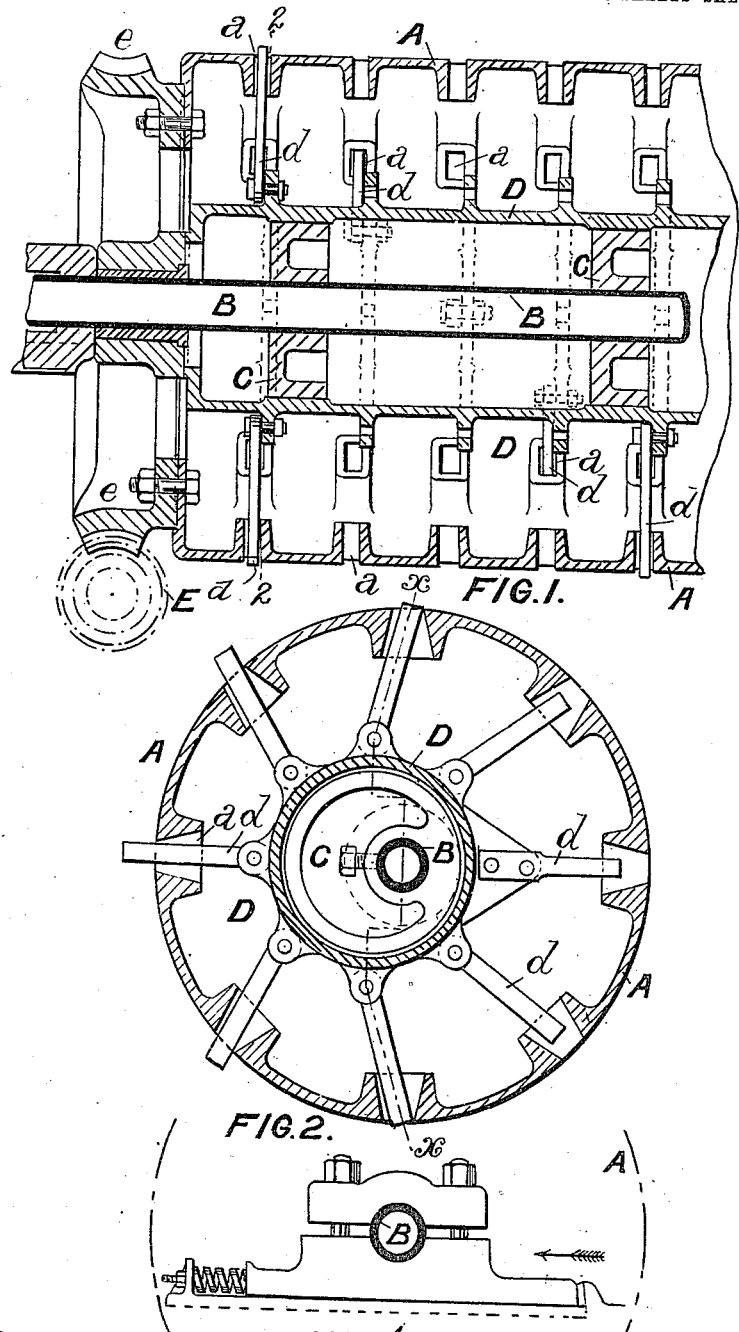
WITNESSES.
INVENTOR
Henry N. Leask
By
James L. Norris
Atty

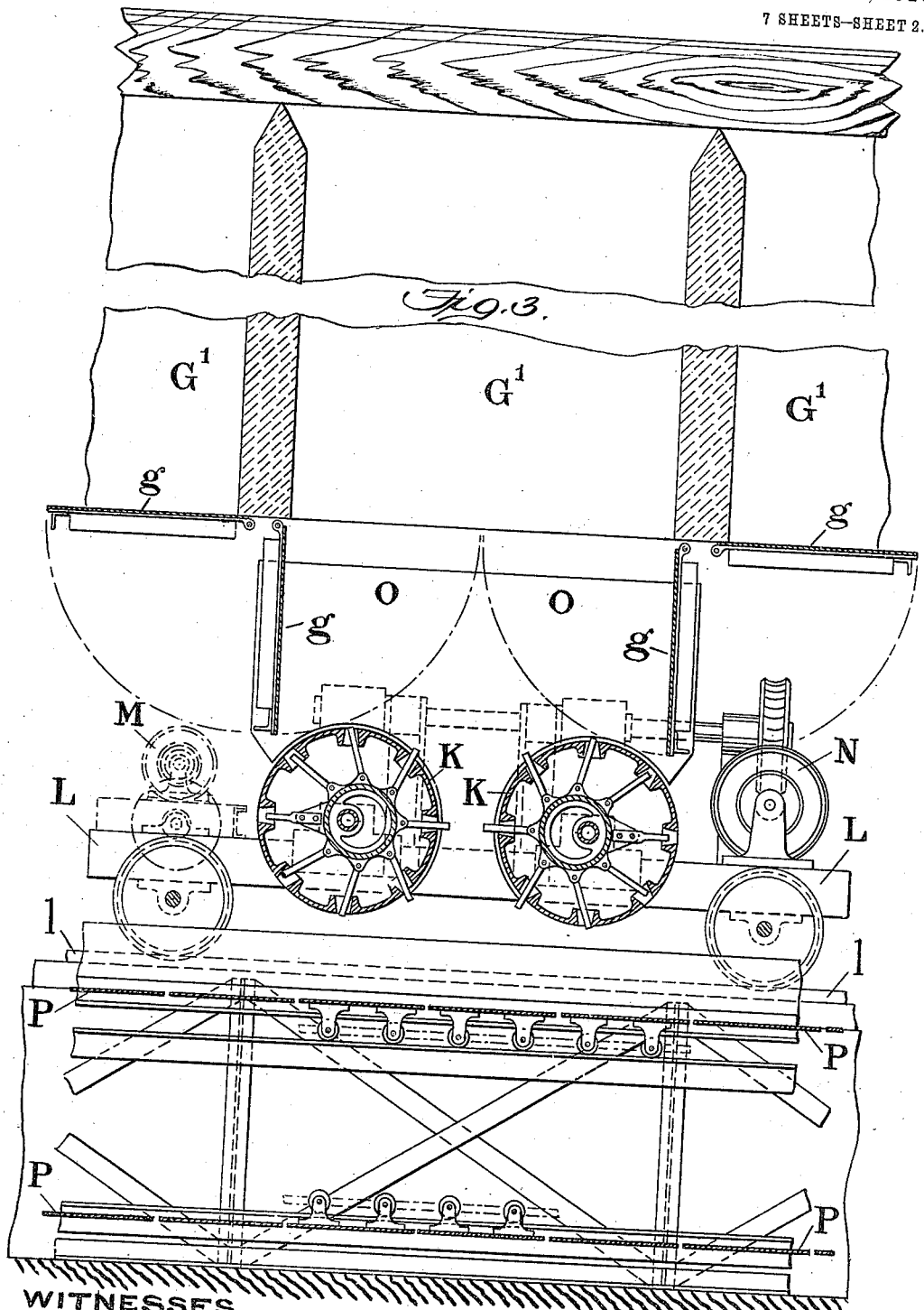

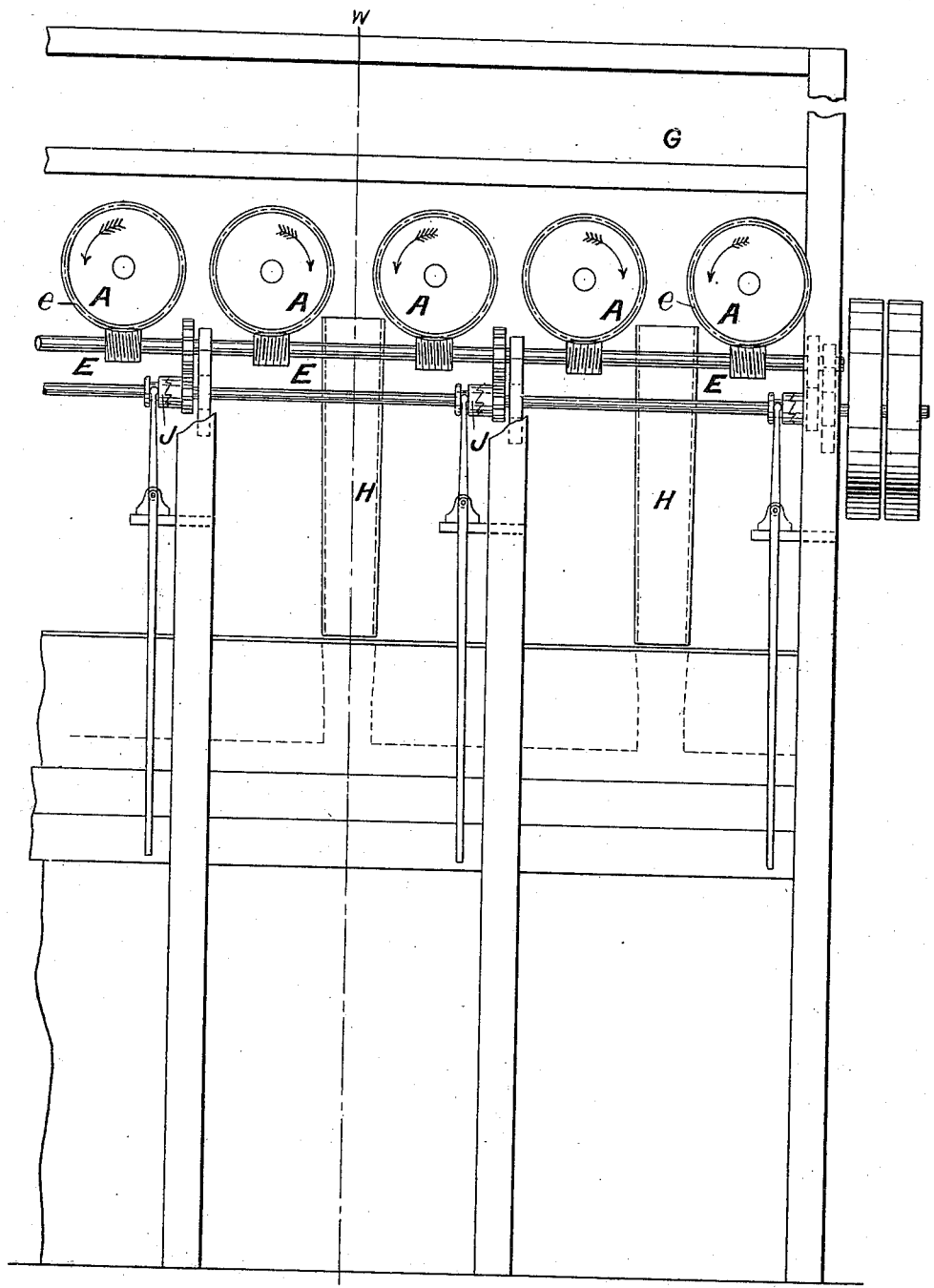

H. N. LEASK.
MEANS FOR CHARGING REFUSE DESTRUCTORS.
APPLICATION FILED OCT. 30, 1908.

974,680.

Patented Nov. 1, 1910.
7 SHEETS—SHEET 5.

WITNESSES.

INVENTOR.
Henry N. Leask
By
James L. Norris
Atty.

UNITED STATES PATENT OFFICE.

HENRY NORMAN LEASK, OF EGREMONT, ENGLAND.

MEANS FOR CHARGING REFUSE-DESTRUCTORS.

974,680.  Specification of Letters Patent.  Patented Nov. 1, 1910.

Application filed October 30, 1908. Serial No. 460,309.

*To all whom it may concern:*

Be it known that I, HENRY NORMAN LEASK, a British subject, residing at Egremont, county of Chester, England, have invented certain new and useful Improvements in Means for Charging Refuse-Destructors, of which the following is a specification.

The invention relates to a drum or roller designed for feeding fuel of all kinds but more especially for feeding refuse, garbage, or other difficultly handled materials to furnaces and to the application of said drum or roller to a furnace.

It consists essentially of a drum or roller of plain checkered or other surface having one or more series of prongs, fingers or rams arranged therein which are so constructed that during the rotation of the drum or roller they are gradually projected at one side of the drum or roller to feed forward any material in contact with the roller and then gradually withdrawn to clear the prongs of same, and in apparatus where the drum or roller is applied to feed the fuel to a furnace.

The invention will be fully described with reference to the accompanying drawings.

Figure 6:
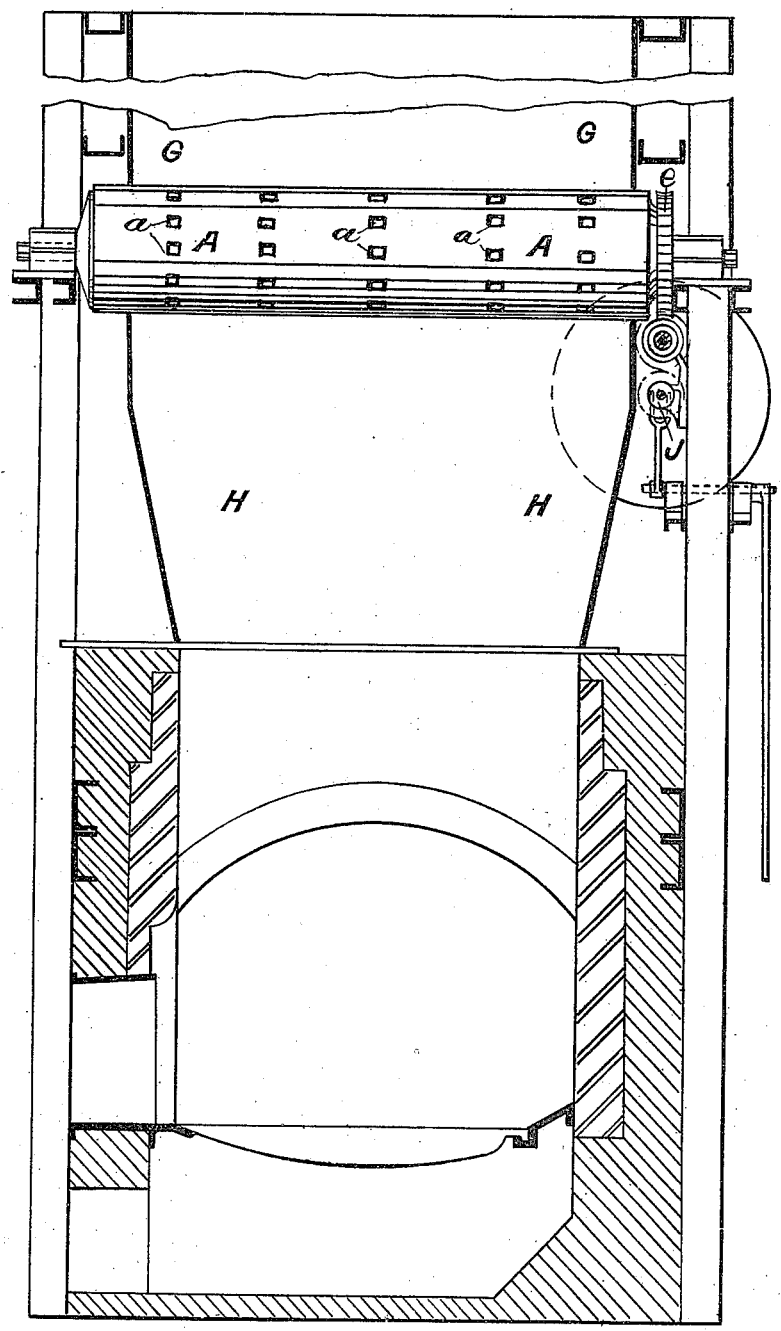
Figure 7:
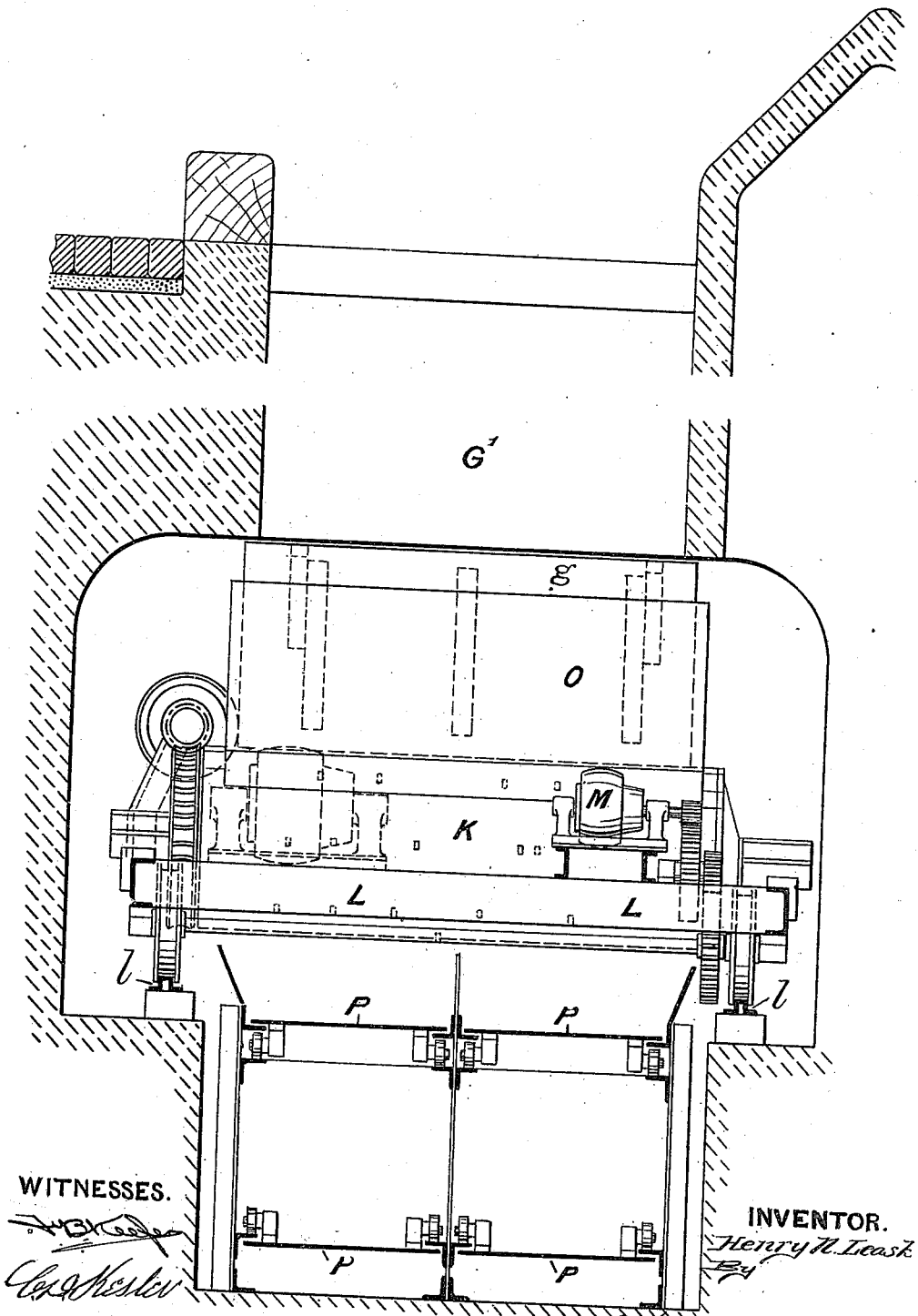
Figure 8:
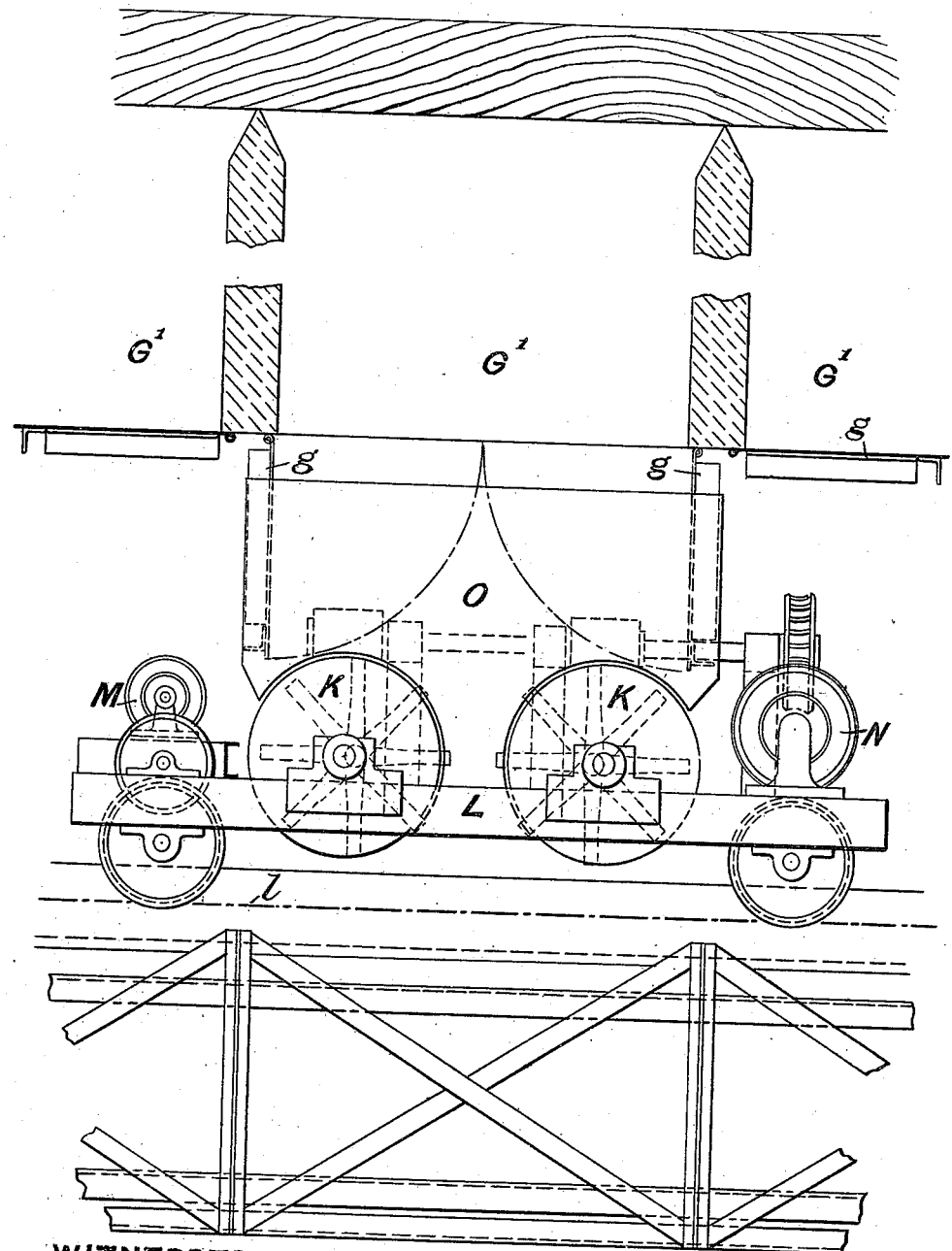
Figure 9:
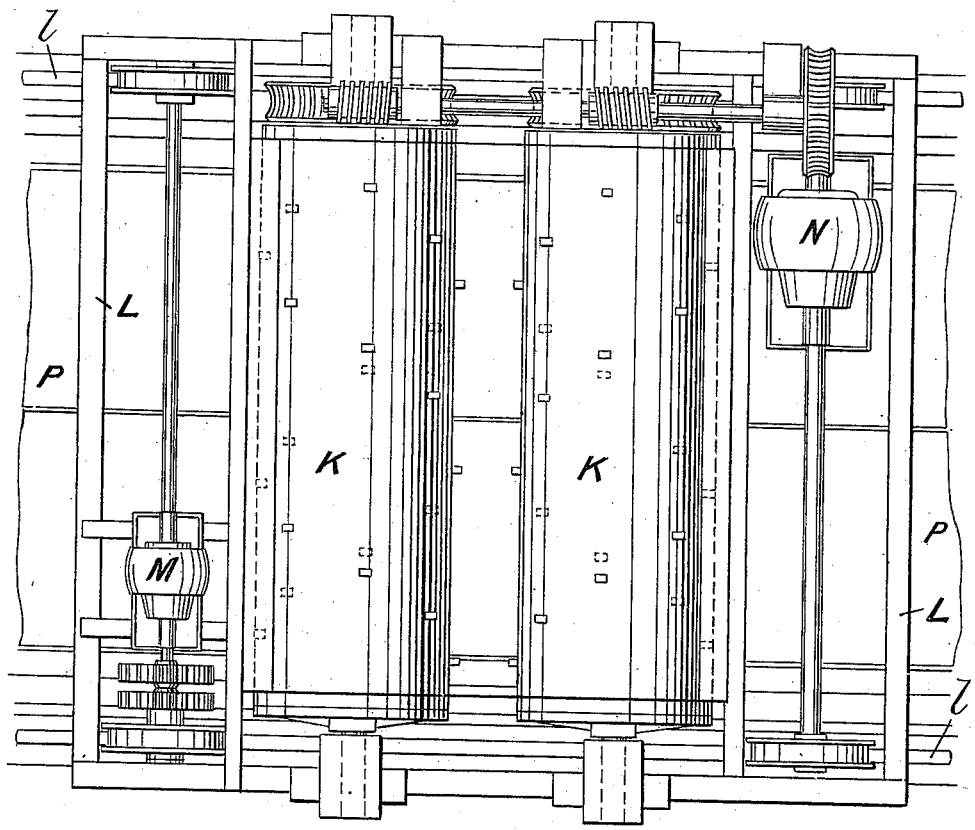

Figure 1. is a longitudinal section on line $x$—$x$ Fig. 2. of feed drum or roller constructed according to the invention and showing some of the parts thereof omitted. Fig. 2, is a cross section of same one the line 2—2, Fig. 1. Fig. 3 is a longitudinal vertical sectional view cutting through the hoppers, rollers and conveyer intermediate of the tracks. Fig. 4. is a detail view showing spring bearing arranged to allow play for the drums or rollers should anything bulky pass between them. Fig. 5. is a general elevation of part of a refuse destructor showing one method of application of the drums or rollers. Fig. 6. is a transverse section on line $w$—$w$ Fig. 5. Fig. 7. is a sectional view showing application of a pair of drums or rollers to a truck traveling under a series of fuel receiving hoppers arranged to feed the fuel from the hoppers to a conveyer adapted to deliver it to a series of furnaces. Fig. 8. is a sectional side view of same. Fig. 9. is a plan of the truck provided with the rollers.

In the form of the invention shown in Figs. 1 and 2 a drum or hollow roller A to feed the refuse is mounted centrally upon a dead shaft B and upon the same shaft are fixed two or more eccentric sheaves C on which a second drum or roller D is mounted loosely so that it can rotate freely on the fixed eccentric C on a different axis to the outer feed drum or roller A.

On the internal eccentric drum or roller D are fixed either rigidly or hinged a number of fingers or prongs $d$ arranged to enter holes $a$ in the surface of the outer drum or roller A and during part of their revolution to project through these holes. These prongs or fingers $d$ may be arranged in rings as shown or may be arranged spirally in the manner shown in Figs. 3 to 5.

The feed drum or roller A is positively driven in any suitable manner say by a worm E and worm wheel $e$ on the end of the drum or roller A and the inner drum or roller D may be driven by the prongs or fingers $d$ projecting through the holes $a$ formed in the outer drum, or the inner drum may be positively driven and the outer one driven through the medium of the said prongs or fingers projecting through the holes $a$, or both drums may be geared together and positively driven.

As shown in the drawings one longitudinal row of the prongs or fingers $d$ is rigidly fixed to the drum D and drive it by being forced around by the rotation of the feed drum A. The other fingers are pivoted to the drum D to allow the necessary play during the rotation of the drums.

When all the prongs $d$ are rigidly secured to the drum D the holes in the feed drum A for them to project through are made sufficiently long to allow the necessary play owing to the eccentric rotation of the drum D and prongs.

Scrapers of any suitable construction may be employed if desired to scrape off any material sticking to the surface of the feed drum or roller A. The edges of the chute H (Figs. 7 and 8) may be formed so as to scrape the drum or roller A.

The inner drum D may form an oil bath in which a quantity of oil is placed to keep it lubricated on the eccentrics C.

If desired air under pressure may be admitted to either or both drums to prevent any dust or other material entering through the holes in the drums or the bearing surfaces. Boxes may be provided surrounding the driving parts, such as the gearing driving the outer or inner drum, to which air under pressure may also be admitted.

Fig. 4 shows a bearing arranged with a spring device which may be used to allow the whole feed drum organization in each instance to move over a certain distance should any bulky or irregular object get between a pair of drums or rollers.

In Figs. 5 and 6 of the drawings is shown one method of application of the feed drums or rollers to a refuse destructor for feeding the fuel to the furnace.

The refuse is filled into a hopper G above the feed drums or rolls A which are arranged in pairs over the door of each furnace. The drums or rollers of each pair rotate in opposite directions so as to direct the refuse into a chute H which leads the refuse into the furnace, and as they rotate the prongs or fingers d are projected through the shell of the drums or rollers and take hold of or draw the material down from the hopper G and feed it forward to the chute H.

Suitable means are provided such as a clutch J for enabling the drums or rollers to be put into or out of action.

In Figs. 7 to 9 is illustrated another method of applying the drums or rollers to the feeding of a series of furnaces whereby one pair of drums or rollers can be employed to feed a large number of furnaces from a number of fuel receiving hoppers.

A pair of drums or rollers K constructed as above described are mounted upon a truck or trolley L adapted to travel on rails l or upon any other suitable track under a series of fuel receiving hoppers G', the hoppers G' being provided on the underside with doors of any suitable construction. In the drawings swing doors g are shown but sliding doors or doors of any other construction may be employed.

The trolley L may be traveled either mechanically electrically or by hand. In the drawing it is shown traveled electrically a motor M being provided for this purpose. Another motor N is also provided for rotating the drums or rollers K, but one motor may be employed for this purpose, or the drums or rollers may be rotated by any other means. The trolley is provided with sides O to prevent the fuel falling about and to direct it on to the drums or rollers when the doors g are lowered.

Beneath the trolley is arranged a conveyer P which may be of any suitable construction on to which the fuel is fed by the drums or rollers at any desired rate and which is adapted to convey it and deliver it to one or more furnaces either directly or indirectly as desired.

There are several advantages arising from the provision of a plurality of hoppers. One is that where the hoppers are arranged directly over the furnace a separate hopper can be provided for each furnace. Another advantage is that one hopper can be emptied while the others are being filled, and still another and most important advantage is that the separate hoppers can be closed to the outer air so that no cold air is drawn into the furnace while the refuse is being fed thereto. This latter operation permits the other hoppers to be filled while one is being emptied. A still further advantage is that the hoppers may be individually emptied much more expeditiously than a single large hopper.

The plant may be arranged in duplicate so that should one half break down the entire plant would not be disabled.

What I claim as my invention and desire to protect by Letters Patent is:—

1. Feeding means of the class described consisting of an outer hollow drum having openings through the circumferential wall thereof at regular intervals, a dead shaft upon which said drum is rotatably mounted and provided with eccentrics, a smaller drum rotatably disposed within the outer drum and engaging the eccentrics, and projections movably attached to the inner drum and extensible through the openings of the outer drum.

2. Feeding means of the class described comprising an outer hollow drum provided with openings, means for positively rotating the outer drum, and a smaller drum eccentrically and loosely mounted within the outer drum and having projections movably attached thereto and projectable through the openings of the outer drum, the smaller drum being moved within the outer drum through the projections engaging the opening of the latter drum.

3. In a device of the class specified for supplying fuel to fire, a series of hoppers having bottom doors, a truck movable under the hoppers, a pair of rollers mounted upon the truck and one of the rollers mounted eccentrically within the other and provided with fingers projectable and withdrawable through the other roller to forwardly feed the fuel when the doors of a hopper over the truck are open, and a conveyer under the truck to receive the fuel and feed it forward toward the fire.

In testimony whereof I have hereunto set my hand in presence of two subscribing witnesses.

HENRY NORMAN LEASK.

Witnesses:
 I. OWDEN O'BRIEN,
 HARRY BARNFATHER.